April 3, 1973   R. S. ROSBOROUGH, JR., ET AL   3,725,168
METHOD OF SPLICING THE TWO ENDS OF FILM STRIPS
Original Filed Sept. 3, 1969

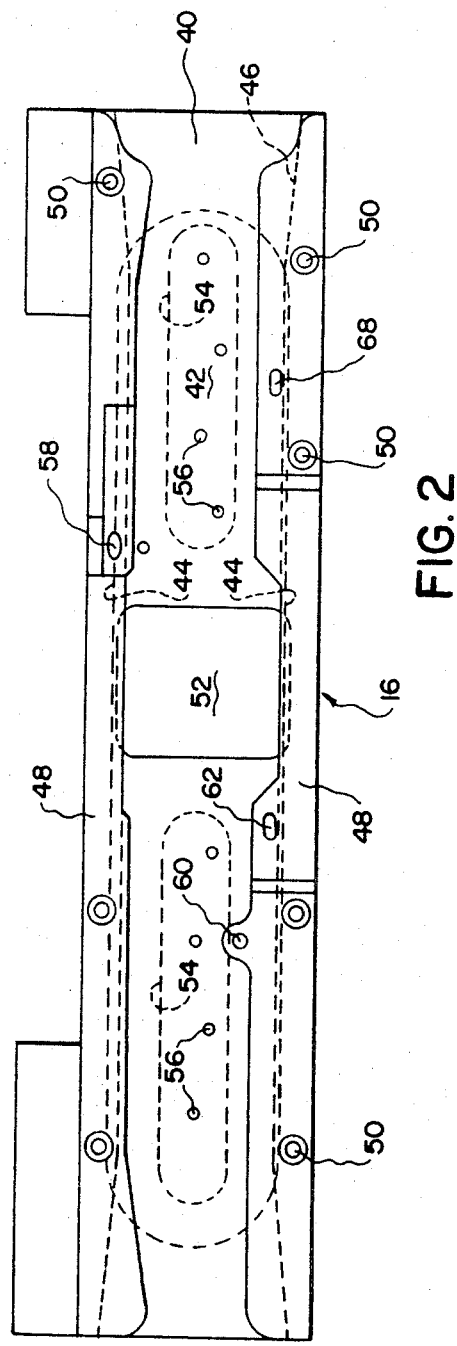
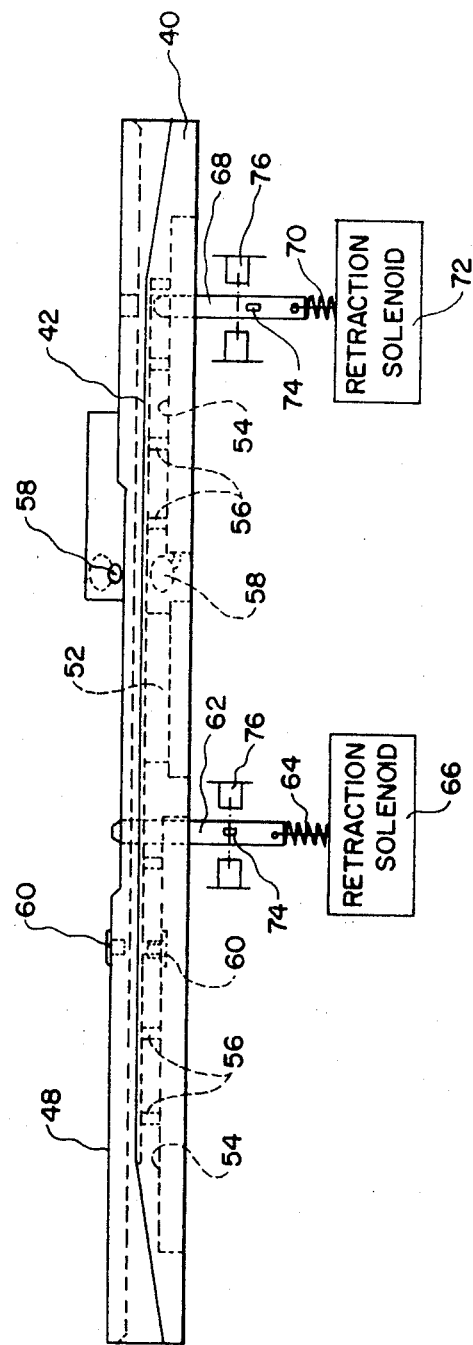
FIG. 2
FIG. 3

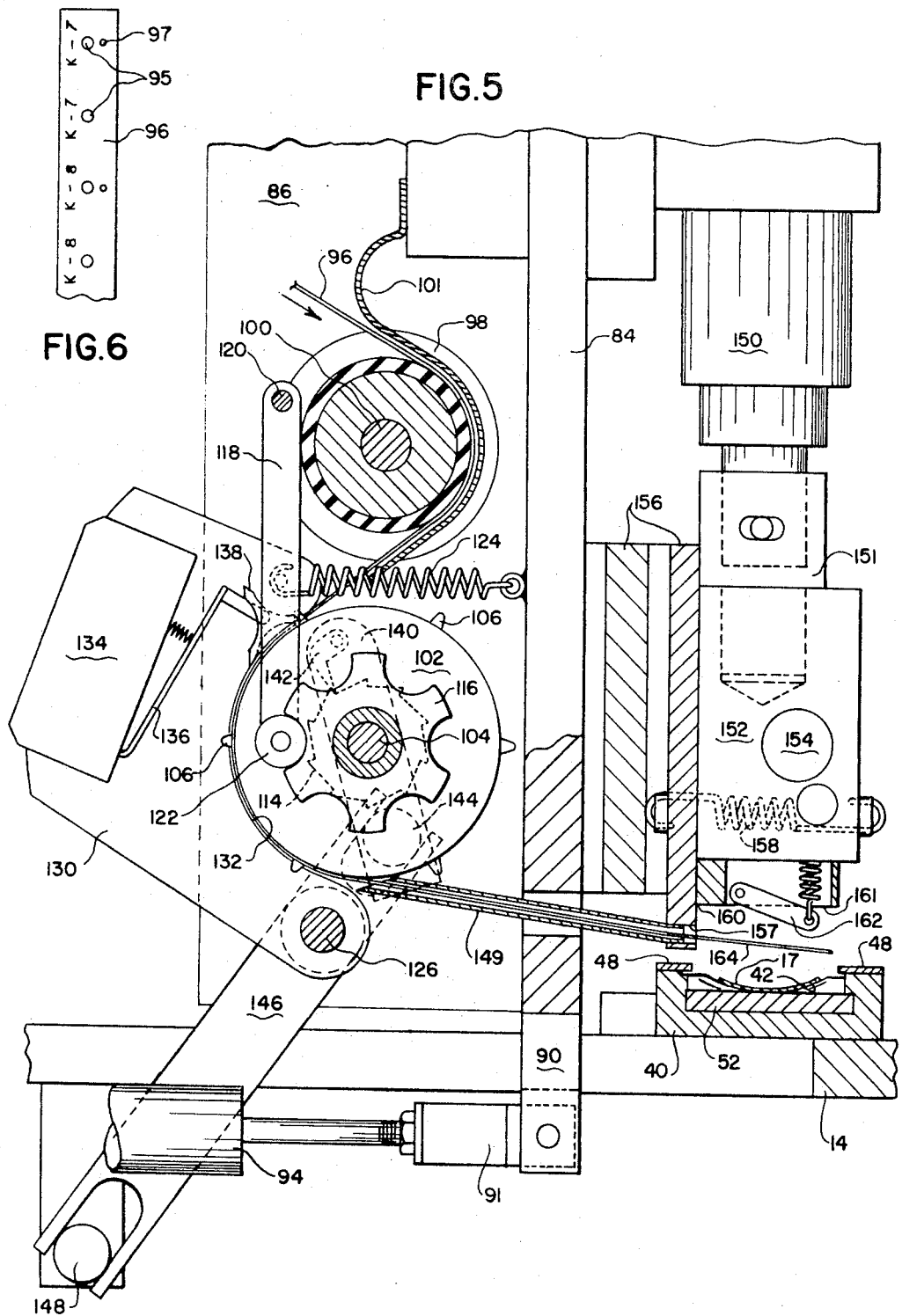

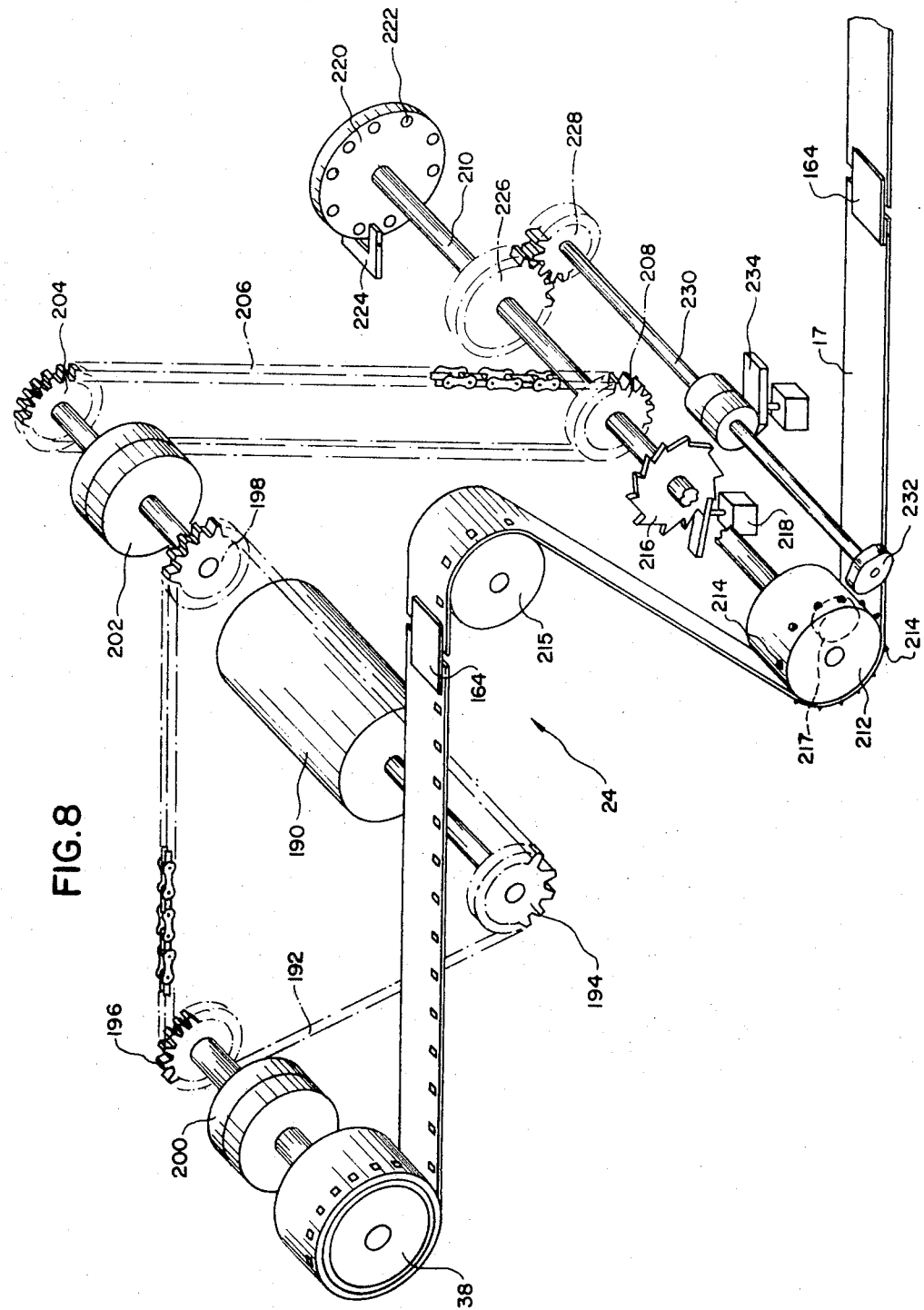

3,725,168
METHOD OF SPLICING THE TWO ENDS OF FILM STRIPS

Robert S. Rosborough, Jr., Rochester, and Luther M. Wright, Brockport, N.Y., assignors to Eastman Kodak Company, Rochester, N.Y.
Original application Sept. 3, 1969, Ser. No. 854,886, now Patent No. 3,634,171. Divided and this application Mar. 18, 1971, Ser. No. 125,841
Int. Cl. B31f 5/00; G03d 15/04; G03f 1/00
U.S. Cl. 156—157                         1 Claim

ABSTRACT OF THE DISCLOSURE

A method and apparatus for splicing and identifying web or film strips comprising the steps of splicing individual lengths of a web into a substantially continuous strip while providing the proper repetition of steps to assure that the web is not mis-identified. The splicing and identification apparatus provides means for accurately aligning and spacing the web to obtain the necessary splice characteristics and includes sequential interlocks which assure the completion of all splicing and identification procedures in the proper order.

The two web ends are aligned and held in splicing relationship at an applicator station. An indicia-bearing member is applied first to a web identifier at the applicator station and then a corresponding indicia-bearing member is applied to the web ends at the applicator station to splice the ends together. Only after both indicia-bearing members have been applied, are the web ends moved from the applicator station.

BACKGROUND OF THE INVENTION

This application is a division of United States patent application Ser. No. 854,886, filed Sept. 3, 1969, now Patent No. 3,634,171.

Commercial film processing generally utilizes a film processor through which the exposed film is passed in sequence through a series of operation-performing stations, including developing, fixing, washing and drying stations. Many commercial film processors operate continuously whereby the individual strips of exposed film as received from the customer are spliced into a continuous length which is then passed in a substantially continuous manner through the processor. Inasmuch as the exposed film is susceptible to fogging by light, it is necessary for the film to be handled in substantial darkness. Generally, the film arrives at the film processing plant in an identifying envelope bearing the name and address of the film owner, or other owner identification. The film, still in its light-tight container and in the customer identification envelope, is usually placed with other film of similar characteristics and is transported to a darkroom. In the darkroom, the film is removed from the customer identifying envelope and the light-tight film container is opened. One end of the strip of film is then spliced to the trailing end of the preceding strip of film and is unwound from the container onto a master roll.

Inasmuch as the film must pass through operations in which it is immersed in chemicals and liquids which would destroy the customer identification accompanying the film on its arrival at the plant, another form of identification must be applied to the film while it passes through the processor. Normally, at the time the film is spliced to the preceding strip of film a common identification symbol or number is applied to both the film and the customer identification envelope, such as number-bearing tapes utilized for the splice between the adjacent strips of film and a correspondingly numbered tape applied to the envelope.

For successful passage through a film processor, the film must be accurately and securely spliced together. Should the splices not be secure, the film may part at the splice while in the processor, resulting in costly shut-downs and delays as well as damage to the customers' film. Should the splices not be accurately made, i.e. be misaligned, they may not possess the requisite strength and may break, or they may jam in the transport apparatus, causing the film to break elsewhere. Prior art film splicing stations have utilized a film alignment track having a width just equal to that of the film whereby the film is held in place for splicing by friction. However, to obtain the proper friction grip, prior art tracks have an adjustable width, permitting misadjustment or loosening of the adjustment, with a resultant misalignment of the film being spliced. Moreover, the use of friction to hold the film in place often causes damage, such as edge nicks, to the customers' film which may be sufficiently weakened as to break while passing through the processor. Thus, any improvements in the splicing of the film result in increased productivity and decreased damage to customers' film.

After a sufficient length of film has been spliced together to form a master roll, the roll is transferred to the input end of the processor. Thus, the processor is continuously supplied with film from master rolls. After the film has passed through the processor it is again wound onto a master roll which is then removed from the processor area for subsequent cutting and packaging for return to the customer. With photographic print film, the processed master roll of negative film is passed through a photographic printer which generates positive prints from the negatives in the master roll. After the prints are processed and dried they are matched to the proper negative film for cutting, packaging, and returned to the customer. At the time the processed film is packaged for return to the customer it is necessary to rematch the identification number on the film with the same identification number on the customer identification envelope.

It is common practice to return photographic negative film in strips containing three or four frames rather than in a single, long strip. Thus, after the negative has been printed and the prints have been processed, the finished prints and negative film are delivered, in master roll form, to a packaging station wherein the prints and negatives are mated, identified, and packaged for return to the customer. The photographic prints are automatically cut from the master print roll into individual pictures by an automatic chopper which detects chopping information on the print web. The chopping information is generated during the exposure of the prints so that they can be automatically cut apart without cutting through the picture area. A similar method of cutting the negatives is also employed, cutting the master roll into short strips containing three or four negatives. The sensing of the proper location for cutting the negative film is more difficult due to the fact that the film does not contain sufficiently easily detectable frame lines to permit automatic sensing of the frame lines by the chopper apparatus. However, it has been found that, when processing a film having a single perforation located along the edge in precise relationship with the picture area, the perforations may be used to accurately locate the film so the chopper cuts the film between the picture areas. However, to make such an automatic sensing apparatus simpler and more economical, the spacing between adjacent perforations across a splice joint must be maintained within close tolerances. In view of the fact that splices are made in substantial darkness, accurate, consistent manual spacing of the film strips prior to splicing is difficult. Accordingly, the automatic, precise spacing of the film while making the splice provides significant production advantages.

At the same time, experience has shown that repetitive splicing operations, especially when conducted in the dark, can lead to the misidentification of the film. This occurs when, through distraction or fatigue, the operator fails to follow the prescribed splicing sequence and thus does not apply a splicing tape having the same number to both the film and the corresponding customer identification envelope.

It is apparent that an arrangement which automatically and accurately aligns and spaces film strips, securely splices the strips together, and assures substantially foolproof identification thereof is extremely desirable. Such an arrangement would permit increased production rates and reduced costs by substantially reducing the handling steps necessary to properly splice and identify the film strips prior to processing while substantially eliminating errors in identifying the film and assuring the requisite splice strength and uniformity.

SUMMARY OF THE INVENTION

Accordingly, the present invention provides a method and apparatus for splicing and identifying film strips comprising means for splicing individual lengths of film into a substantially continuous strip with apparatus which assures the proper repetition of steps to assure that the film is not misidentified. The continuous strip is wound into a master roll for supply to a film processor. The splicing and identification apparatus provides means for accurately aligning and spacing the film to obtain the necessary splice characteristics and includes sequential interlocks which assure the completion of all splicing and identification procedures in the proper order.

Thus, the present invention provides a method of splicing a strip of film, having a plurality of picture defining frames disposed thereon and at least one perforation in the film corresponding to each frame, to the trailing end of a preceding strip of film. The method comprises the steps of withdrawing a leading end of the strip of film from a film supply and inserting the leading end into an open end of a film guiding track arranged to support and align the film. The leading end is advanced in the track and the end of the film is sensed, thereby releasing a perforation locating pin arranged to engage the perforation corresponding to the first picture frame in the film. The pin locates the leading end of the film in alignment with and colsely adjacent the trailing end of the preceding strip of film. A splicing member is applied to the film ends to connect them together and the film is automatically advanced.

Furthermore, the present invention provides a method wherein the film identification is applied to a film identifier before the film is withdrawn from the film supply.

In addition, the present invention provides a web splicing and identifying apparatus comprising means for aligning and holding two web ends in splicing relationship at an applicator station and means for presenting a web identifier to the applicator station. Means is arranged for applying an indicia-bearing member first to the web identifier at the applicator station and then applying a corresponding indicia-bearing member to the web ends at the applicator station to splice the ends together. And means is provided, operable only after both indicia-bearing members have been applied, to move the web ends from the applicator station.

The present invention also provides a web splicing and identifying apparatus comprising a web alignment track with a web supply holder disposed at a first end thereof and a web wind-up assembly disposed at the opposite end. A splice and identifier applier assembly is normally disposed adjacent one edge of the track and is arranged to move to above the track. A web identifying container handling member is normally disposed adjacent the edge of the track opposite the splice and identifier applier assembly and is arranged to move to above the track. Control means is arranged to actuate the splice and identifier applier assembly to first move to above the track only when the container handling member is over the track and to apply an indicia-bearing member to a web container in the handling member and to return both the splice and identifier applier assembly and the container handling member to the respective normal positions. Means is arranged to sense and positively position the trailing and leading ends, respectively, of two webs in the track in alignment with the splice and identifier assembly. The control means is arranged to actuate the splice and identifier applier assembly to move the track and to apply a splice member to the ends of the webs to splice them together, the splice member bearing the same indicia as the indicia-bearing member just applied to the web container. The control means is arranged to then retract the splice and identifier applier assembly.

Moreover, the present invention includes means arranged, upon the second retraction of the splice and identifier assembly to actuate the web wind-up assembly to wind the web until the trailing end of the web is adjacent the first end of the track. Means is arranged to cut the trailing end of the web, whereupon the control means actuates the web wind-up assembly to draw the trailing end of the web into alignment with the splice and identifier assembly.

More specifically, the present invention provides apparatus for splicing and identifying a strip of film having a plurality of picture defining frames disposed thereon and at least one perforation in the film corresponding to each frame. The apparatus comprises a film alignment track including means providing a pneumatic film bearing surface. A supply film holder is disposed at a first end of the track and a film wind-up assembly is disposed at the opposite end of the track. A splice tape applier assembly is normally disposed adjacent the rear central edge of the track and is arranged to move forward over the track. The splice tape applier assembly comprises a vertically movable tape applying head arranged to move downwardly into contact with the envelope or film when the tape applier assembly is over the track. The splice tape applier assembly also includes means to feed a single tape portion beneath the tape applying head as the tape applier assembly is moved forwardly over the track. A film identifying envelope handling slide tray is normally disposed adjacent the front central edge of the track opposite the splice tape applier assembly. The envelope handling slide tray is spring-loaded to the normal position but is arranged to be moved rearwardly over the track with a releasable latch means arranged to hold the slide tray in the rearward position, and means is provided for detecting the position of the slide tray. Control means is arranged to actuate the splice tape applier assembly to first move forwardly over the track only when the envelope handling slide tray is rearward over the track. The splice tape applier is arranged to apply an indicia-bearing tape to an envelope in the tray and to return the splice tape applier assembly to the normal position and to release the envelope handling tray latch. The splice tape applier assembly is arranged to apply a tape to an envelope only when the tape being applied is the first of two tape portions bearing the same indicia and only after a previously spliced film has been wound to the center of the track. A first pin member is resiliently mounted in the track on the wind-up assembly slide of the center thereof with means arranged to releasably hold the first pin down. The pin hold-down means is arranged to be released by the film wound-up assembly to engage the last perforation in the film strip to precisely locate the trailing end thereof in the track. A second pin member is resiliently mounted in the track on the supply film holder side of the center thereof with means arranged to releasably hold the second pin down. Means is arranged to sense the leading end of a film strip being fed into the alignment track and to release the second pin upwardly into the track to engage the first perforation in the film strip to precisely locate the leading end thereof in the track. The first and second pin members are longitudinally spaced along the track a distance equal to a plurality of perforation spaces. The control means is arranged to sense the upward position of the first and second pin members and the presence of both ends of the film strips in the track and to actuate the splice tape applier assembly to move forwardly over the track and to apply a splice tape to the ends of the strips of film to splice them together. The splice tape bears the same indicia as the tape just applied to the envelope. The splice tape applier assembly is arranged to apply a tape to splice the strips of film together when the tape being applied is the only tape portion bearing that indicia. The control means is arranged to then retract the splice tape applier assembly and to actuate the film wind-up assembly to wind the film until the trailing end of the strip of film is adjacent the first end of the track. The film wind-up includes a film take-up spindle and a drive sprocket having a plurality of teeth members disposed about the periphery thereof, with each tooth member arranged to engage a perforation in the film. A drive member is connected through a first clutch to the film take-up spindle and through a second clutch to the drive sprocket, with the drive means applying a substantially constant torque to the take-up spindle. A selectively operated ratchet is arranged between the drive sprocket and the second clutch to permit selective movement of the drive sprocket by the drive means. Means is arranged to sense the angular movement of the drive sprocket and to selectively operate the ratchet. The teeth members are selectively depressable into the surface of the drive sprocket and means including a cam is arranged to engage and depress teeth members in the sprocket corresponding to perforations missing in the film at the splice. The cam has a number of lobes equal to the number of missing perforations in the film at the splice and is connected to and driven by the drive means through a single revolution clutch. Means is arranged to actuate the clutch in response to the location of the film whereby the cam depresses the teeth members in the peripheral area of the drive sprocket which will engage the splice of the film. Means to cut the trailing end of the strip of film is disposed at the supply film holder end of the track. The control means is arranged, after the trailing end of the film strip is cut, to actuate the film wind-up assembly to draw the trailing end of the film to the center of the ment track;

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which a preferred embodiment of the present invention is illustrated and described.

BRIEF DESCRIPTION OF THE DRAWINGS

FIG. 2 is an enlarged plan view of the film splice alignment track;

FIG. 3 is an elevation view of the film splice alignment track;

FIG. 5 is a side elevation view, partly in section, of the splice tape applier assembly taken along line 5—5 of FIG. 4;

FIG. 6 is a plan view of a section of splice tape utilized by the preferred embodiment of the present invention;

FIG. 8 is a schematic illustration of the film wind-up assembly.

DESCRIPTION OF A PREFERRED EMBODIMENT

The following description of a preferred embodiment of a film splicing and identifying apparatus will be directed to apparatus arranged to accommodate cartridge loaded film of the type disclosed in U.S. Pat. Nos. 3,086,-862, 3,138,081 and 3,138,084. As disclosed in these patents, the film is contained within a disposable cartridge and, when fully exposed, is wound on a take-up spool. The film is provided with backing paper which is also wound on the take-up spool. The film is provided with a pre-exposed picture frame around each exposure area and a perforation along the edge of the film uniformly and precisely located with regard to each picture frame. This type of film is customarily provided in cartridges holding film capable of taking twelve or twenty exposures, depending upon the length of the film contained therein. While the apparatus is described specifically arranged to handle this film format, it will be apparent that the apparatus may be used with other film formats with little or no alterations in the apparatus or the concepts embodied therein.

Figure 1:
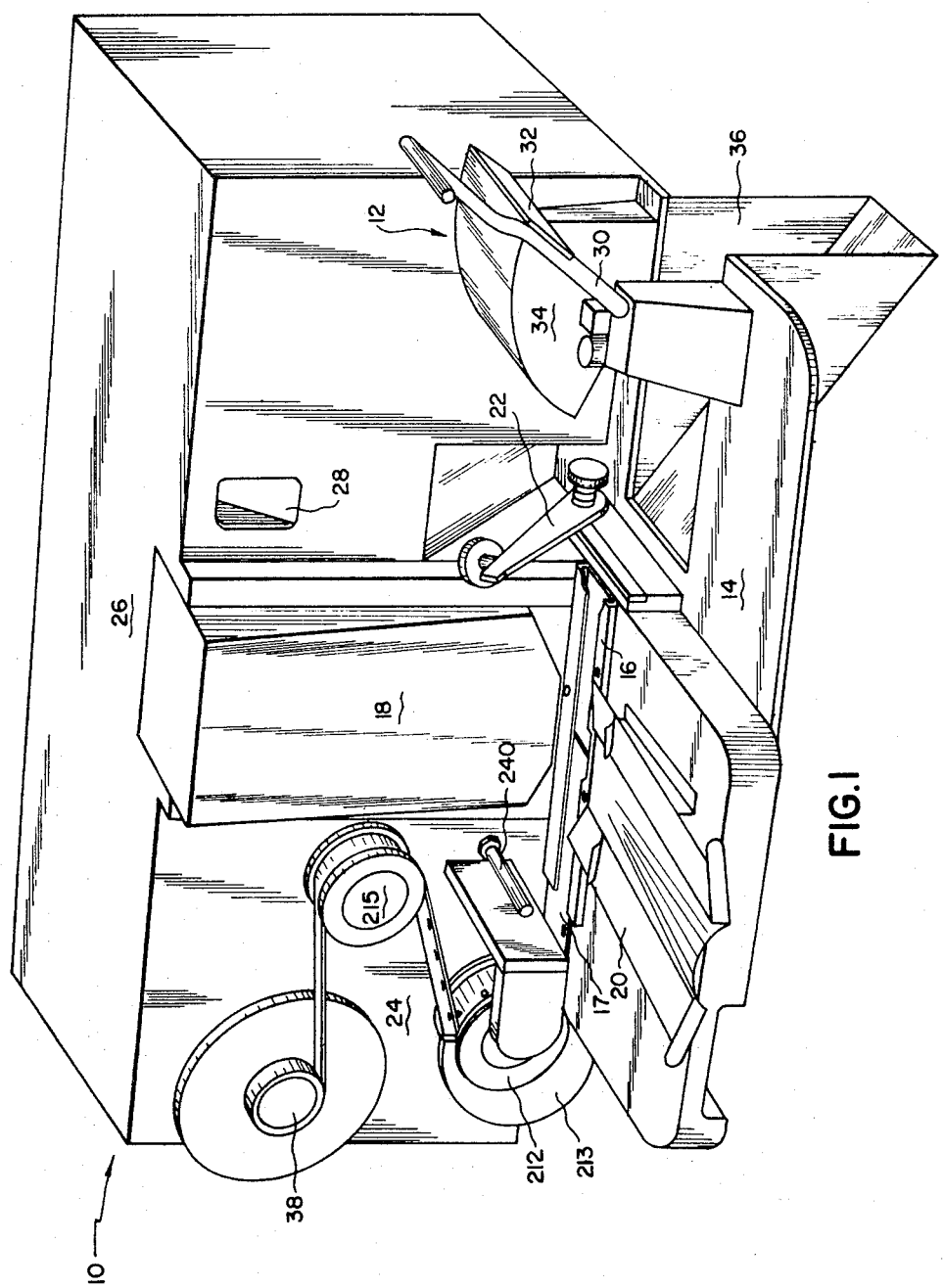
FIG. 1 is a perspective illustration of a film splicing and identifying station showing the general arrangement of the various components of a preferred embodiment of the present invention.

A film splicing and identifying apparatus 10 is illustrated generally in FIG. 1 and may be divided into the following major sections: a film cartridge-opener assembly 12 mounted at the right end of a splicing station table 14. A film splice alignment track 16 (detailed in FIGS. 2 and 3) is disposed in front of the operator, in the center of the top of the table, and extends from right to left. Film 17 is shown in the left end of the track. A splice tape applier assembly 18 (detailed in FIGS. 4 and 5), is disposed on the rear side of the center of the track and an envelope handling slide tray 20 (detailed in FIG. 7) is arranged on the front side of the track, opposite the splice tape applier assembly. A film cutter 22 is provided at the right end of the film splice alignment track between the track and the cartridge opener. A film-wind-up assembly 24 (FIG. 8) is disposed at the left end of the film splice alignment track. The actuating mechanisms and controls are disposed within housing 26 at the rear of the splicing station table 14. A machine status indicator 28 is arranged in the front panel of the housing 26 to provide the operator with a visual indication of the machine status during the operation thereof.

Briefly, the operator, seated before the center of the splicing station table 14, picks a customer envelope from a supply box (not shown) at the right and removes the film container or cartridge from the envelope. The customer identification envelope is inserted into the envelope handling slide tray 20 and the tray is pushed forward, over the film splice alignment track. The splice tape applier 18 is then actuated, applying an identification number-bearing tape to the customer identification envelope and the envelope handling slide tray is retracted. The film cartridge, containing the exposed film, is inserted in the cartridge opener 12. The cartridge opener may be of the type which is the subject of co-pending application Ser. No. 802,511, filed Feb. 26, 1969, now Pat. No. 3,587,954 and comprises means for pivotally gripping the cartridge spool and a pivoted handle 30 with a cartridge engaging member 32. The cartridge is inserted so that the spool is gripped and the handle is then moved upwardly and to the right, breaking the cartridge body away leaving the film-containing spool rotatably held in the opener. The opener is illustrated with the handle 30 approaching the extreme right position. A curved shield member 34 is provided for the opener to prevent pieces of a fractured cartridge from flying into the face of the operator or into the splice alignment track. The broken cartridge is discharged into chute 36 and is dropped into a waste container. The backing paper is unwound from the spool until the end of the film is reached. The film is pulled from the spool and the backing paper is separated and fed to chute 36 and the end of the film is inserted into the right end of the splice alignment track 16 until that end is sensed at the center of the track. The film is automatically stopped in proper alignment with, and spaced from, the end of the preceding strip of film. The splice tape applier is actuated again, applying an identification number-bearing splice tape to the film in the film splice alignment track, splicing the two film ends together. This second splice tape is provided with the same number as the tape applied to the corresponding identification envelope just identified. After the splice is completed, the film is automatically wound onto the film wind-up spindle 38 by the film wind-up assembly. The wind-up assembly winds the film, still connected to the cartridge spool, until the end thereof is adjacent the right end of the splice alignment track, after the operator has determined whether the film contains twelve or twenty exposures. The cutter 22 is then actuated, severing the film from the backing paper and the cartridge spool. The wind-up assembly draws the end of the film to the center of the track and stops it, ready for the next film strip. The cartridge opener handle 30 is returned to the left, ejecting the empty spool and the backing paper down chute 36, ready to accept the next cartridge. More specifically, and as will become apparent hereinbelow, the present splicing and identification apparatus provides means for accurately aligning and spacing the film to obtain the necessary splice characteristics and includes sequential interlock which assure the completion of all splicing and identification procedures in the proper order. Moreover, all of the foregoing is accomplished at substantially higher production rates than heretofore possible, and with less damage to the film.

Film splice alignment track

The film splice alignment track 16 is shown in plan view in FIG. 2 and in elevation view in FIG. 3. The track is formed of a base member 40 having an upper film support surface 42 which has a width along the major portion of the length thereof substantially equal to the width of the film being handled, as indicated at 44, and widening at the inlet end thereof, as indicated at 46, to facilitate the insertion of the end of the film therein in total darkness. An upper flange portion 48 is provided to both sides of the track and is fastened thereto as by bolts 50. The lower surfaces of the upper flange portions are spaced from the film support surface 42 a distance at least as great as the thickness of the film being handled. The flanges extend over the film support surface a small amount to overlap the edges of the film in the film alignment track and provide accurate alignment for the film. However, the flanges are arranged so that they do not overlap into the picture area of the film so that there is little possibility that the picture area will be scratched. The major portion of the film support surface 42 is concave, as shown in FIG. 5. A resilient splice pad 52, having a flat upper surface, is disposed in the film alignment track at the center thereof. The concave support surface is provided with a transition zone to and from the flat splicing pad. An air plenum chamber 54 is provided beneath the concave film support surfaces and supplies air thereto through a plurality of holes 56 so that the film is actually supported on a thin layer of air, thus reducing the possibility that the lower surface of the film will be scratched by the film support surface 42.

A photocell arrangement 58 is disposed in the splice alignment track adjacent the inlet side of the splicing pad 52 and is arranged to detect the leading end of the film as it is moved in the splice alignment track and approaches the splicing pad. A similar photocell arrangement 60 is disposed on the outlet side of the splicing pad 52 at the front edge of the track and is arranged to sense the presence or absence of a splice tape at that edge of the track. This photocell is arranged to stop the film wind-up assembly if the splice tape does not extend to the front edge of the film resulting in a potentially weak splice joint that could later separate.

A first pin member 62 is arranged for vertical movement through the edge of the film alignment track on the wind-up assembly side of the resilient splicing pad 52. The pin is normally urged in the upward position through both the film support surface 42 and the front upper flange 48 by a spring member 64. The lower end of pin 62 is connected to the selectively operable solenoid 66 which is arranged to pull the pin 62 down against the force of spring 64 and hold it in the downward position so long as the solenoid is actuated. A second pin member 68 is mounted for vertical movement through the edge of the film splicing track on the supply film holder side of the splicing pad 52. This pin member is also provided with an upwardly acting spring member 70 and a retraction solenoid 72 and operates in a manner similar to pin member 62. Both pin members are provided with a blade member 74 and a cooperating photocell arrangement 76, whereby a control signal is generated when the respective pin members are in the upper position, extending through a perforation in the film. In the arrangement illustrated, the blade member 74 is interposed between the photoelectric source and sensor 76 when the pin is in the upward position. The first pin member 62 is spaced from the center of splicing pad 52 a distance substantially equal to the distance between the trailing end of the strip of film and the last perforation therein. Thus when pin member 62 engages the last perforation of the trailing end of the film in the splice alignment track, the end of the film is properly disposed for splicing to the next succeeding strip of film. Similarly, pin member 68 is spaced from the center of splicing pad 52 a distance substantially equal to the distance from the first perforation in a strip of film to the leading edge thereof so that it, too, is held in proper splicing position when pin member 68 engages the first perforation of that strip of film.

The first film locating pin member 62 is held in the downward position by solenoid during the operation of the film wind-up assembly 24, as will be described hereinbelow, and is released upwardly as the photocell 58 is uncovered and indicates the approach of the trailing end of the strip of film whereby the pin engages the last perforation in the film. The second film locating pin member 68 is held in the downward position while the wind-up assembly is winding film and is released upwardly when the wind-up stops to cut the end of the film from the cartridge spool, providing accurate location of the film end when it is cut. After the film is cut, the second film locating pin member 68 is retracted until the photocell 58 is covered by the insertion of the new film strip when it is released to engage the first perforation in that film strip. It is to be noted that the film locating pin members 62 and 68 are spring mounted so that a pin member will not damage the film should the perforation not be directly over the pin location when it is released. Thus the pin would be held down by the film until the perforation is moved into the proper location over the pin.

Splice tape applier assembly

Figure 4:
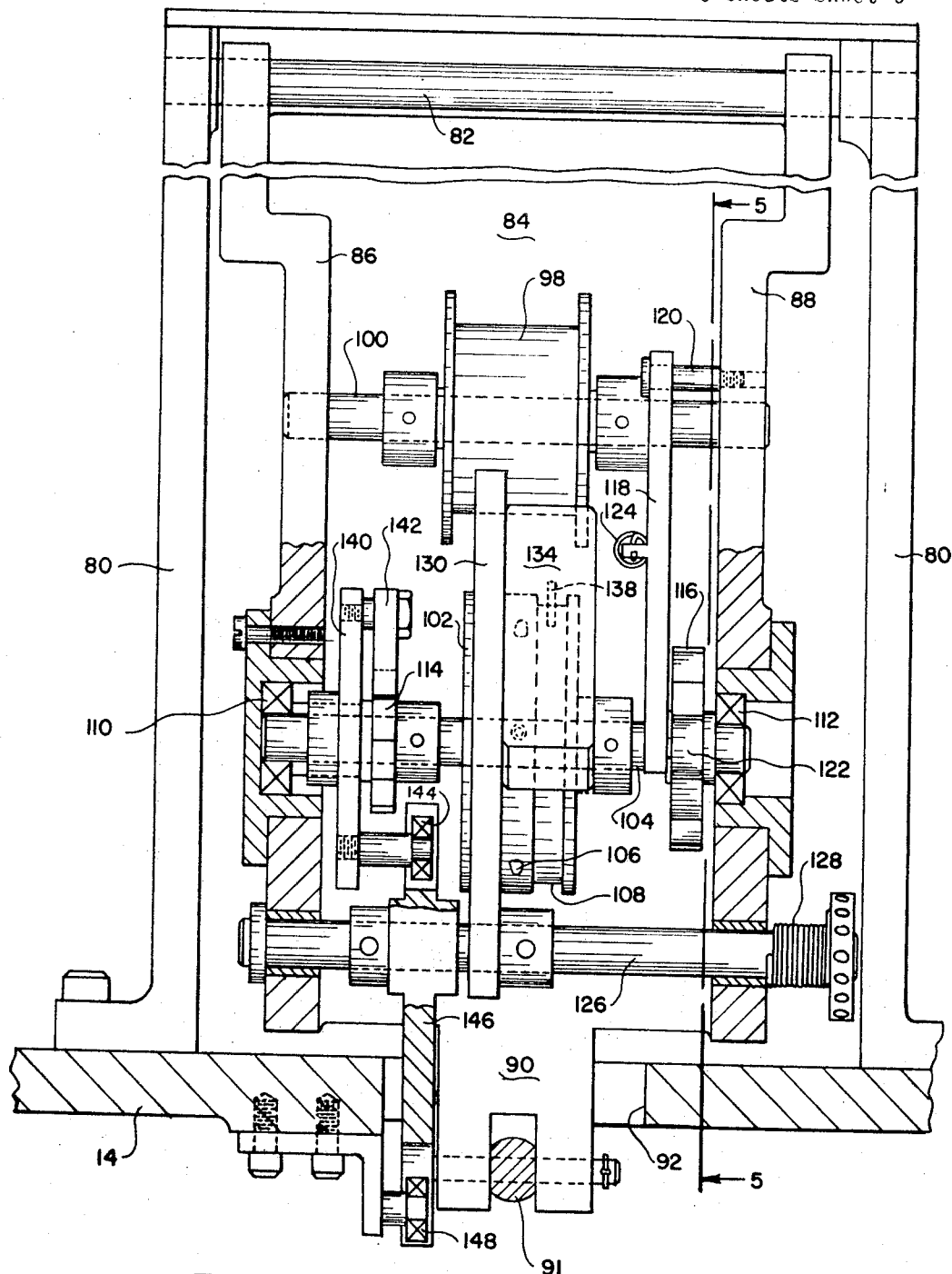
FIG. 4 is a rear elevation view, partly in section, of the splice tape applier assembly.

The splice tape applier assembly is illustrated in FIGS. 4 and 5 and comprises a spaced pair of vertical support members 80 extending upwardly from the top surface of the splice station table 14. A horizontal shaft 82 extends between the top of the support members and is arranged to pivotally support the channel-shaped splice applier assembly mounting plate 84 which hangs downwardly therefrom. The mounting plate is arranged with the flat surface on the splice alignment track side thereof and the flanges 86 and 88 extending to the rear. The major portion of the mounting plate 84 extends downwardly from shaft 82 to the top of the splicing station table 14. A centrally disposed tongue portion 90 of the mounting plate extends through an opening 92 in the table 14 and is connected at the lower end, below table 14, to the end 91 of the piston of a hydraulic or pneumatic cylinder 94 which selectively pivots the mounting plate 84 about shaft 82.

The splicing tape 96 is supplied to the tape applier head 152 over the alignment track by a metering mechanism disposed on the rear of the mounting plate 84. A short length of the tape 96 handled by present apparatus is shown in FIG. 6 and is formed of a material which will not be adversely affected by the processing chemicals through which the film is passed. In the preferred embodiment, the tape is provided with a heat-activated adhesive on the bottom surface. However, it will be appreciated that other types of adhesive could equally satisfactorily be used with little modification to the present apparatus. The tape has a width sufficient to provide the necessary splice strength to the film splice joint and is supplied to the tape applier head 152 in longitudinal increments substantially equal to the width of the film. Each longitudinal increment is provided with an identification indicia such as a number, as shown. Two adjacent increments are provided with the same indicia, the first for the customer identification envelope, the second for the film splice. Each tape increment is provided with a centrally disposed hole 95 which is used to positively and incrementally feed the tape to the applier head. Every other increment of tape, i.e. each envelope identification section of tape, is provided with a second hole 97, which provides an indication of cycle timing, as will be further described hereinbelow.

The tape metering mechanism comprises an idler roller 98 supported by a horizontal shaft 100 extending between the two flange members 86 and 88. A tape drive sprocket 102 is rotably supported on shaft 104 which is parallel to and beneath shaft 100. A tape guide plate 101 is arranged to guide the end of the tape 96 as it is threaded from a supply roll, not shown, around roller 98 and drive sprocket 102. The tape drive sprocket 102 is provided with a plurality of radially extending frustoconical-shaped finger members 106, which are spaced about the periphery of the drive sprocket a distance substantially equal to the spacing between the adjacent central holes 95 in the splice tape 96. The finger members are arranged to engage the holes 95 and thus provide controlled, accurate feed of the tape to the tape applier head. The tape drive sprocket is also provided with a peripheral groove 108 in alignment with the lateral position of the alternate holes 97 in the splice tape. The tape drive sprocket 102 is connected to and rotates with the shaft 104 which is rotatably supported in the flange members 86 and 88 by bearing members 110 and 112, respectively. Also connected to and movable with shaft 104 are a ratchet wheel member 114, and detent wheel member 116. A detent follower arm 118 is pivotally connected by bolt 120 to flange 88 and engages the detent wheel 116 with a follower roller 122. The detent follower arm 118 is biased into contact with the detent wheel by a spring member 124 connected to the follower arm and the front mounting plate 84. As illustrated, the detent wheel is provided with the same number of detents as there are finger members 106 on the drive sprocket. The detents are so aligned with the finger members that the drive sprocket is moved in positively controlled increments thereby a predetermined length of tape is fed to the tape applier head.

A third horizontal shaft 126 extends between and is supported by flange members 86 and 88. This shaft is parallel to and below shafts 100 and 104 and is rotatably supported in the flange members. Shaft 126 is rotationally biased by an adjustable spring assembly 128 at one end thereof. A tape guide member 130 is connected to and rotates with shaft 126 and has a surface 132 which is complementary to the outer periphery of the drive sprocket 102 and cooperates therewith to form a feed path for splice tape 96. The guide member 130 provides a support for a microswitch assembly 134 having a resiliently mounted switch arm 136 which carries a rotatable star wheel 138 at the outer end thereof. The star wheel is disposed in alignment with the peripheral groove 108 in the tape drive sprocket 102 and is arranged to sense and engage the offset holes 97 in the splice tape and, when such a hole is engaged by a tooth of the star wheel, to be rotated by the movement of the tape, moving the arm 136 and actuating the microswitch 134 to provide a signal for use by the apparatus control system, as will be described hereinbelow. As illustrated, the star wheel is not engaging an offset hole 97 in the splice tape. Thus, in the arrangement shown, there are exactly six increments of tape from the star wheel location to beneath the tape applier head. Accordingly, the position of the star wheel as shown provides a signal which sets the control system to the film splicing mode whereby the tape applier head will be actuated during the next activation cycle only if all of the conditions are met for the film splicing mode. The spring adjustment 128 on shaft 126 is arranged to selectively vary the force with which guide member 130 bears against the periphery of tape drive sprocket 102 and, at the same time, the force with which the star wheel 138 is pressed against the tape.

The tape advance drive comprises a pawl arm 140 which is independently pivotally supported on shaft 104 and has a tape advance pawl 142 connected to the upper end thereof which engages and drives the ratchet wheel member 114. A roller bearing member 144 is connected to the lower end of pawl arm 140 below shaft 104. An actuator arm 146 is supported by shaft 126 and pivots independently thereabout and has a first end which extends above shaft 126 and a second end which extends below the shaft. The two end portions of arm 146 are bifurcated with the upper end arranged to engage the roller bearing member 144 on the lower end of the pawl arm 140. The lower bifurcated end of the actuator arm 146 is arranged to engage a roller bearing member 148 which is fixed to and supported by the lower surface of table 14. In operation, when the drive cylinder 94 is actuated to swing the splice tape applier assembly back away from the splice alignment track, i.e. by moving mounting plate 84 to the left in FIG. 5, the lower end of actuator arm 146 is held by bearing member 148, causing the arm to rotate about shaft 126. As the actuator arm 146 rotates about shaft 126 the upper end thereof, engaging bearing member 144, causes the pawl arm 140 to rotate about sheaft 104 whereby the advance pawl 142 engages a new face on the ratchet wheel member 114. During forward movement of mounting plate 84, actuated by cylinder 94, the movement of the actuator arm and the pawl arm are reversed, causing the ratchet wheel member 114 to rotate, turning the tape drive sprocket 102 and the detent wheel member 116 and advancing the splice tape 96 by one increment through a guide channel 149 to beneath the tape applier head 152 over the splicing pad 52 of the film alignment track 16. The detent follower wheel 122 is forced out of the detent until the next detent rotates into place thereby positively limiting rotational advance of the tape drive sprocket 102. The splice tape applier assembly is provided with a pair of microswitches, not shown, which indicate the position of the assembly in either the rearward position or the forward position, over the film alignment track.

The tape applier head assembly (see FIG. 5) is comprised of a pneumatic or hydraulic cylinder 150 mounted on the upper front surface of mounting plate 84 and arranged for vertical movement the piston portion thereof. The lower movable end 151 of the piston carries a tape applier head 152 which, in the preferred embodiment, is arranged to apply an increment of tape 164 having a heat activated adhesive and incorporates therein at least one heater cartridge 154. The tape applier head 152 is vertically slideable along a bearing plate assembly 156 and is held thereagainst by a pair of spring members 158 which pivot to permit vertical movement of the head. The lower end of bearing plate assembly 156 is provided with an opening 157 which cooperates with the end of the tape guide channel 149 to supply the end of the splice tape to the area over the splice pad 52 beneath the tape applier head 152. The lower rear edge 160 of the tape applier head 152 is arranged to act as a guillotine cutter to cut the increment of tape 164 extending out from opening 157 from the tape supply. The lower face 161 of the tape applier head is substantially flat and is arranged to press the cut end of the tape to the envelope or the film joint and to hold it there while heat is applied to form a seal therewith. A spring-loaded finger member 162 is arranged in a slot in the lower face of the tape applier head 152 and extends downwardly therefrom to engage the outer end of the tape before it is severed from the remaining tape supply and to push the tape into contact with the film or envelope and hold it there while the trailing end of the tape is severed by the lower rear edge 160 of the tape applier head.

The tape applier head assembly is provided with a first microswitch (not shown) that senses the location of the tape applier head 152 in the lower, film or envelope contacting position and activates a timer mechanism which is preset for the length of time necessary to form a good connection of the tape to the film or envelope. The timer mechanism is arranged, at the end of the tape sealing period, to release the fluid supply valve to cylinder 150 causing it to return the tape applier head 152 to the upper position whereby a second microswitch (not shown) is activated which provides a "head up" indication to the control system.

Envelope handling slide tray

Figure 7:
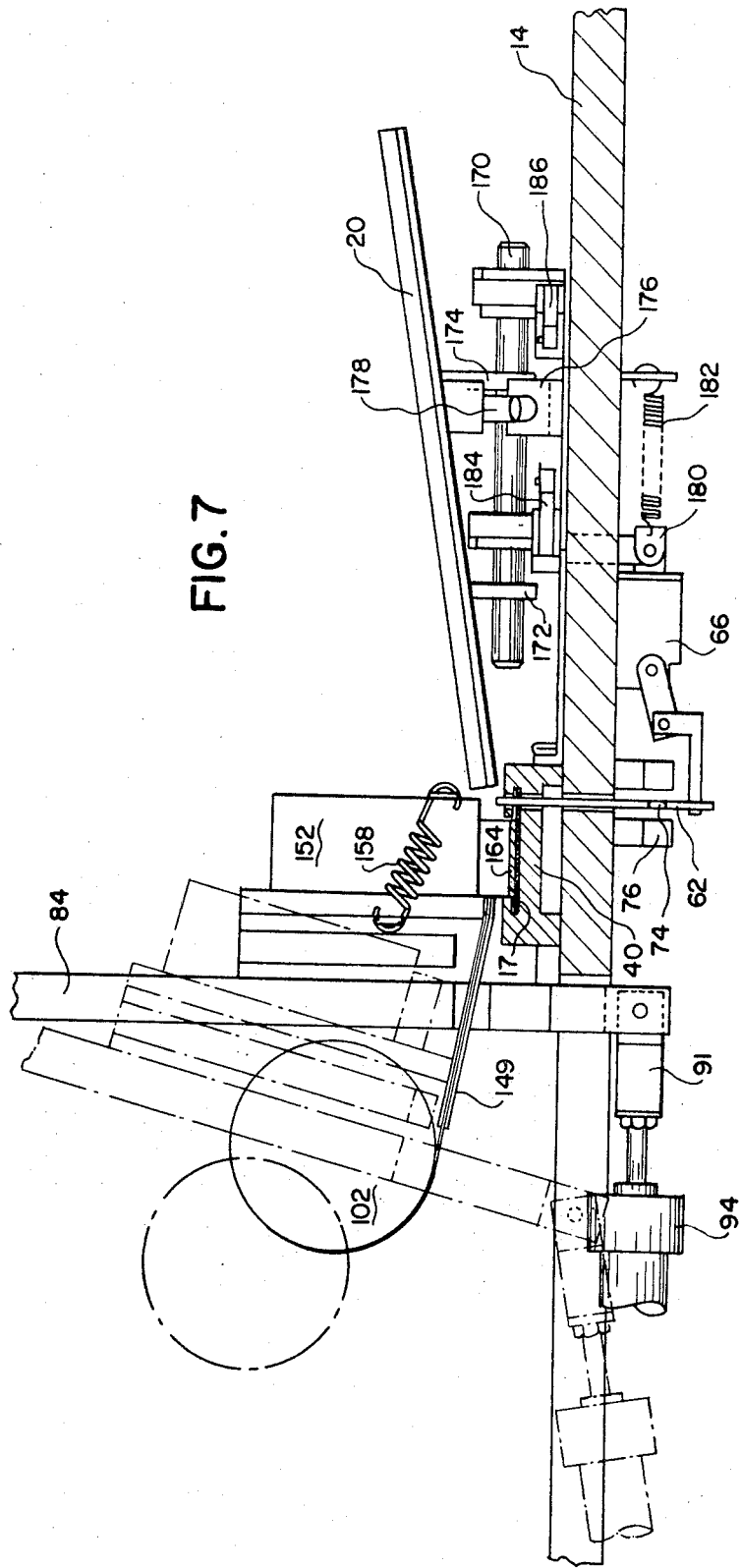
FIG. 7 is a horizontal sectional view taken through the envelope handling slide tray.

A horizontal sectional view through the envelope handling slide tray 20 is shown in FIG. 7 and shows the tape applier assembly, in full, applying the splice tape 164 to the film splice. The position of the tape applier assembly on the rearward stroke is indicated in phantom. In this illustration, the first pin member 62 is in the upper position through the last perforation in the trailing end of the film 17. The blade member 74 is over the photoelectric eye 76 providing the control system within an indication that the film is in place. The envelope handling tray 20 is supported on a pair of horizontal bars, only one of which 170 is shown, by bearing members 172 and 174. A horizontal, spring-loaded fork member 176 is mounted for horizontal rotation on the upper surface of table 14 and is engaged by pin 178 extending from the lower surface of the envelope handling slide 20. The fork member 176 is spring-loaded so that the envelope handling tray is normally in the outer position, away from the film alignment track. Thus, the operator must push the tray against the force of the spring member associated with fork member 176 to move the envelope handling tray over the film alignment track. A spring latch 180 extends up through the table 14 to engage a latch plate (not shown) on the bottom of the envelope handling tray 20 to hold the envelope handling tray in the position over the film alignment track. The spring latch 180 is releasable by a solenoid, not shown, connected to the under side of table 14 and is springloaded to the latch engaging position by spring 182. Microswitches 184 and 186 are provided on the upper surface of table 14 and are engaged by fork member 176 to indicate the position of envelope handling slide tray 20 to the control system. It should be noted that the envelope handling slide tray 20 is normally not in the position shown but is either held over the splice alignment track by the spring latch 180, or is sprung to the outer position by spring-loaded form member 176 and is shown in this position only for the sake of clarity, to show microswitches 184 and 186.

Film wind-up assembly

A schematic illustration of the film wind-up assembly 24 is illustrated in FIG. 8 and comprises a drive motor 190 which constantly drives endless chain member 192 through sprocket 194. The chain 192 in turn drives sprockets 196 and 198. Sprocket 196 is connected through a slip clutch 200 to the wind-up spindle 38. Sprocket 198 is connected through a hysteresis clutch 202 to a sprocket 204 which engages a second chain drive 206 which in turn drives the film advance sprocket 212 through sprocket 208 and shaft 210. The film advance sprocket 212 is connected at the outer end of shaft 210 in a common vertical plane with film wind-up spindle 38. The film drive sprocket 212 is provided with a plurality of depressable teeth members 214 disposed about the periphery thereof and arranged to engage each film perforation. The film 17 is threaded from the end of the film alignment track 16 around the film drive sprocket 212 under a guide shoe 213 (FIG. 1) which assures that the film perforations are maintained in engagement with the teeth members 214. The film is then threaded around an idler wheel 215 to the film wind-up spindle 38. The idler wheel 215 is spring mounted, in a manner well known in the art, to maintain a substantially constant tension in the film as it is wound on spindle 38 and to minimize the shock forces imposed on the film by the intermittent movement of the film advance sprocket 212.

A ratchet wheel 216 is connected to shaft 210 and is releasably held by a solenoid-operated ratchet 218. A film perforation counting wheel 220 is connected to the opposite end of shaft 210 from the film advance sprocket 212 and is provided with a plurality of axially-extending holes 222 about the periphery thereof. Each hole corresponds to a tooth member 214 in the periphery of the film advance sprocket 212. A photoelectric cell 224 is arranged to detect the movement of a hole 222 therepast, indicating the movement of film around the film advance sprocket 212 a distance equal to the span between adjacent perforations. A second gear 226 is mounted shaft 210 and engages gear 228 on a shaft 230 which runs parallel to shaft 210. At the outer end of shaft 230 is a cam member 232 arranged to depress teeth members 214 in the periphery of drive sprocket 212 upon rotation of shaft 230. A selectively operable single revolution clutch member 234 is disposed on the shaft 230 between gear 228 and cam member 232. Thus, upon actuation of the single revolution clutch 234 permitting the shaft 230 to rotate, driven by shaft 210, the cam member 232 engages selected teeth members 214 in sprocket 212. In the preferred embodiment, arranged to handle film having the characteristics described hereinabove, the distance between pin members 62 and 68 in the film alignment track 16 is such that two film perforations are omitted across the splice joint. Accordingly, cam member 232 is provided with two lobes whereby, upon a single rotation of shaft 230 two adjacent teeth members 214 are depressed in the periphery of the film advance sprocket 212 corresponding to the location of the missing perforations at the splice joint. A tooth return cam 217 is disposed within the film advance sprocket 212 and is arranged to automatically return the depressed teeth to the outer position as they are moved therepast.

In the operation of the film wind-up assembly 24, drive motor 190 constantly applies the driving force to clutch members 200 and 202. Clutch member 200 is arranged to drive the film wind-up spindle 38 until a predetermined tension occurs in the length of film between the wind-up spindle 38 and the spring-loaded idler wheel 215. At this time, clutch member 200 slips permitting the wind-up spindle 38 to stop. The film advance sprocket 212 is held stationary by the action of ratchet 218 acting on the ratchet wheel 216 causing clutch member 202 to slip. Upon the completion of the application of a splice tape 164 to the joint at the center of the splice pad 52 and the retraction of cylinder 150 to the upper position and the tape applier assembly to the rearward position as indicated by the respective microswitches, pins 62 and 68 are retracted and ratchet 218 is released from the ratchet wheel 216 causing the driving force from drive motor 190 to be transmitted to the film advance sprocket 212 advancing the film. As the film is pulled from the film alignment track 16 by the film advance sprocket 212, tension is reduced in the film between the windup spindle 38 and the sprung idler 215 whereby clutch member 200 transmits a driving force to the wind-up spindle winding the film thereon. As the film advance sprocket 212 is driven, the film perforation counting wheel 220 simultaneously rotates causing pulses to be generated by the photocell 224 which are fed to the control system. The control system senses a total of ten counts corresponding to the advance of ten perforations around the film advance sprocket. While the film advance sprocket 212 is rotated through the ten perforation advance, the control system, after sensing four counts generated by the photocell 224, actuates the single revolution clutch 234 permitting the rotation of shaft 230 and cam 232 to depress two adjacent teeth members 214 corresponding to the approaching splice joint and the omitted perforations thereat. Inasmuch as the clutch 234 is arranged for only a single revolution, no further actuating signals are necessary to stop the cam after the two teeth members are depressed. It will be appreciated that in other arrangements wherein the splice joint causes more or less than two perforations to be omitted, either a multi-revolution clutch or a cam member 232 having a different number of lobes may be utilized. After the film is cut from the cartridge spool, the control system again releases ratchet 218 permitting the film to advance for four more frames, aligning the trailing end of the film at the center of the film splice alignment track.

The film wind-up assembly 24 accurately winds the spliced film strips into a master roll automatically in cooperation with the remainder of the system, adapting to the varying length film strips supplied thereto. Moreover, the wind-up assembly is arranged to wind the film with a substantially constant tension whereby film abrasion is eliminated while minimizing the danger of dishing of the master roll, facilitating loading the film in total darkness into the film processor and the subsequent tracking of the film through the processor.

System operation

In operation, the operator is seated in front of the film splice and identification station table 14. With film 17 already threaded to the take-up spindle 38 and extending over the idler wheel 215 and the film advance sprocket 212 to the left side of the film alignment track 16, and with the end of the film disposed at the center of the splice pad 52, the first pin member 62 is in the upper position engaging the last film perforation. The second pin member 68 is in the down position because no film is detected by photocell 58 in the right hand portion of the film alignment track. The tape advance mechanism star wheel 138 is positioned to indicate that the following tape application is to be a film identification envelope and the control system is in the envelope tape mode. The operator then selects an envelope containing a film cartridge from the film supply (not shown) and the film cartridge is removed from the envelope. The envelope is placed in the envelope tray 20 and the tray is pushed forward, closing microswitch 184 and engaging latch member 180. Upon the closing of microswitch 184, the cylinder member 94 is actuated, pushing the tape applier mounting plate 84 forward over the film alignment track 16. On the forward motion of the mounting plate 84, the tape feed drive feeds an increment 164 of splice tape to beneath the tape applier head 152. As the tape is fed forward the star wheel 138 is rotated to the position to indicate that the following tape application is to be to a film splice and the control system is thereafter changed to the film splice mode. As the microswitch is closed indicating the forward position of the tape applier assembly, the tape head cylinder 150 is actuated driving the tape head 152 downwardly whereby the finger member 162 engages the outer end of the tape increment 164 and pushes it into contact with the envelope in the envelope handling tray 20. Thereafter the rear edge 160 of the tape applier head 152 severs the end of the tape from the tape supply and the lower surface 161 of the tape applier head presses the tape into contact with the surface of the envelope. At the same time, the tape applier timer is actuated by the "head down" microswitch (not shown). When the predetermined time set on the timer expires, the fluid supply valve to cylinder 150 is closed whereby the cylinder and the tape applier head return to the up position. The "tape applier head up" microswitch is then closed which causes the cylinder 94 to draw the tape applier assembly back away from the film alignment guide track 16. Simultaneously, the envelope handling slide tray retention latch 180 is released, whereby the envelope handling slide tray 20 is returned to the outer position by the spring loaded fork member 176 and the operator removes the envelope and places it in a tote box for removal from the station. At this point the tape applier assembly microswitch indicates that it is in the rearward position, the envelope handling slide tray microswitch 186 indicates that it is in the outer position, away from the film alignment track, and the "tape head up" microswitch is closed, whereby the system is ready to splice the new film to the end of the preceding strip of film.

The film cartridge (not shown) is then inserted into the cartridge opener 12 and the handle 30 is moved up and to the right, opening the cartridge and leaving the film bearing spool supported therein. The operator grasps the end of the film backing paper and pulls it from the spool until the end of the film is reached. The film is inserted into the right end of the film alignment track 16 and is pushed into the track until the photocell 58 is covered, at which time solenoid 72 releases pin member 68 which is moved upwardly by spring 70 engaging the first perforation in the film strip. As soon as the pin member 68 is sensed in the upward position by photocell 76, with the photocell 58 indicating the presence of a strip of film in the film alignment track, and with the concurrence of the signal provided by the star wheel 138 in the tape feed assembly, cylinder 94 is actuated, moving the tape applier assembly forward and metering an increment of splice tape 164 to above the splice pad 52. At the same time, star wheel 138 is rotated setting the control system for the envelope tape mode for the next taping sequence. As the "tape applier assembly forward" microswitch is closed, the tape head cylinder 150 is activated causing the head to descend applying the increment of splice tape to the film splice joint and the timer is again actuated. At the end of the predetermined period the timer returns the cylinder 150 and the tape head 152 to the up position, closing the "head up" microswitch and returning the tape applier assembly to the position back away from the film alignment track. As the "tape applier assembly back" microswitch is actuated, the pin members 62 and 68 are retracted by solenoids 66 and 72. As soon as the pin members 62 and 68 are withdrawn, the solenoid operated ratchet 218 is disengaged from ratchet wheel 216 permitting the rotation of the film advance sprocket 212. As the film advance sprocket draws film from the splice alignment track, a jet of air is supplied through nozzle 240 (FIG. 1) which is directed along the film alignment track 16 to assure the removal of any particles from the track which might damage the film. As the film advance sprocket is rotated, the perforated counting wheel 220 also rotates, generating the counting signals in photocell 224 which is sensed by the control system. As soon as ten counts corresponding to ten frames in the film strip are sensed, the ratchet 218 is released, stopping the film advance sprocket 212. Both pin members 62 and 68 are then released to the up position, accurately locating the film strip in the film alignment track. As previously noted, after four counts have been sensed by the control system, the single revolution clutch is engaged, rotating the cam member 232 once to depress the teeth members 214 corresponding to the missing perforations at the splice joint. After the film advance sprocket is stopped, the operator feels the strip of film extending from the right end of the film alignment track to determine whether the cartridge contained a twelve or twenty exposure strip of film. If the cartridge contained a twelve exposure strip of film, the operator will feel a paster joining the end of the film to the backing paper. If no paster is present at this point, the cartridge will have contained a twenty exposure strip of film. If the film contains only twelve exposures, the operator then actuates the film cutter 22 to cut the film from the backing paper and the cartridge spool. As the cutter reaches its lower position, a microswitch (not shown) is actuated which retracts pin members 62 and 68. Upon an indication that the pin members are down, the solenoid operated ratchet 218 is released, permitting the film advance sprocket 212 to further draw the film through the film alignment track. The control system then senses four counts and stops the film advance sprocket. The first pin member 62 is then released to engage the final perforation in the strip of film, locating the end of the film at the center of the splice pad 52. If, however, the operator has determined that the film contains twenty exposures, an override switch, not shown, is activated by the operator and the solenoid operated ratchet 218 again releases ratchet 216 permitting the film advance sprocket 212 to further advance the film. The control system then senses an additional eight counts, at which time the film advance sprocket is stopped and both pin membres 62 and 68 are released, positively locating the film. The operator then feels for the location of the paster connecting the end of the film to the backing paper and the cartridge spool. If the paster is in the proper location, the operator then actuates the film cutter 22, depressing both pin members 62 and 68 and releasing the solenoid operated ratchet 218 so that the film advance sprocket draws four more frames of film through the track. The sprocket then stops, releasing the first pin member 62 to engage the last perforation in the strip of film. The film splice and identifying apparatus is then ready to accept and apply an identification tape to the next film identifier envelope.

While a preferred embodiment of the present invention has been described, various modifications may be made to the apparatus within the teachings of the present invention. For example, while various elements have been described as being either pneumatic or hydraulic cylinders or as incorporating microswitches, it will be appreciated that other analogous components can be utilized in place thereof. Moreover, while the cartridge opener and the film cutter have been described as being manually operated, it will be appreciated that either or both can be power assisted or completely automatically operated. Likewise, it is within the scope of the present invention to provide the film cutter with a lock which prohibits the operation of the cutter except when the prerequisite system conditions have been met. This would prevent the inadvertent cutting of the film at the wrong location.

Similarly, a film end detector can be arranged at the cartridge opener which automatically determines whether the cartridge contained a twelve or twenty exposure strip of film and actuate the control system accordingly. With such an arrangement, it is possible to utilize a completely automatic film cutter which operates only when the end of the film strip is in the proper position, regardless of whether the film strip contains twelve or twenty exposures.

Likewise, the film advance sprocket 212 has been described as incorporating depressable pin members 214 with cam elements 232 and 217 operating to depress and raise the teeth members at the proper time. However, the individual teeth members 214 can be spring mounted whereby they are automatically depressed by the absence of film perforations at the splice joint.

While the present apparatus has been described as being particularly adapted for splicing film strips of the type described hereinabove, it will be appreciated that any film format, including motion picture film, can be successfully handled by this apparatus with little or no modification thereto.

While the identification and splicing means has been described as an indicia-bearing paper tape, it will be appreciated that other splicing and identifying members can be used while still practicing the present invention. For example, plastic splice tape can equally well be utilized by the present apparatus. Likewise, paper tape utilizing a different form of adhesive can be used, eliminating the need for the heater element in the tape applier head. Moreover, indicia-bearing staples may be applied to both the identification envelope and the web joint to splice the webs together. The use of staples would necessitate a modification of the identification and splice applier assembly, but not its cooperation with the remainder of the apparatus.

Moreover, while the preferred embodiment has been described with regard to identifying and splicing film strips, it will be appreciated that this apparatus is equally useful for handling other webs requiring identification, splicing and subsequent processing.

It will thus be seen that the present invention provides a film splicing and identifying apparatus whereby a plurality of individual film strips may be spliced together into a master roll securely and accurately, minimizing damage to the film or breakage thereof as it passes through the film processor. Moreover, the present apparatus assures that each film strip is positively identified with substantially no possibility that a film strip can be misidentified. This is accomplished substantially by the apparatus itself with little or no chance for operator error. To this end the present apparatus is provided with operating controls and sensor switches which are a part of the control system and which are arranged in interlocking manner, requiring the successful completion of all of the preceding steps before each following step may be accomplished. Thus if an operator should be distracted and thereafter attempt to apply an identification tape to an envelope before the preceding strip of film has been spliced, the present apparatus will not operate. Likewise, should an attempt be made to splice the film together before the proper envelope has been identified, the apparatus will not proceed.

Furthermore, the present invention provides an arrangement which permits accurate and rapid alignment and holding of individual film strips at a splice station with the minimum of film handling and the substantial elimination of damage to the film. The present apparatus permits increased film handling rates and reduced cost by substantially reducing the possibility of film damage and the resultant film or splice breaks in the processing apparatus. At the same time, the present apparatus incorporates self-checking, failsafe features. Furthermore, the simplicity of operation of this apparatus is such that operator training time, even for operation in complete darkness is significantly reduced.

The invention has been described in detail with particular reference to preferred embodiments thereof, but it will be understood that variations and modifications can be effected within the spirit and scope of the invention as described hereinabove and as defined in the appended claim.

We claim:

1. The method of splicing a strip of film having a plurality of picture defining frames disposed thereon and at least one perforation in said film corresponding to each frame to the trailing end of a preceding strip of film, the method comprising the steps of withdrawing a leading end of said strip of film from a film supply and inserting said leading end into an open end of a film guide track arranged to support and align said film, advancing said leading end in said track and sensing the end of said film thereby releasing a perforation locating pin arranged to engage the perforation corresponding to the first picture frame in said film, said pin locating said leading end in alignment with and closely adjacent the trailing end of said preceding strip of film, applying a splicing member to said film ends to connect them together, and automatically advancing said film.

References Cited
UNITED STATES PATENTS

| | | | |
|---|---|---|---|
| 2,080,046 | 5/1937 | Hughey | 156—505 |
| 2,539,611 | 1/1951 | Daniel et al. | 156—505 |
| 3,379,597 | 4/1968 | Di Francesco | 156—506 |
| 2,539,611 | 1/1951 | Daniel et al. | 156—505 |

PHILIP DIER, Primary Examiner

U.S. Cl. X.R.

156—250, 363; 352—56